United States Patent
Harris et al.

(10) Patent No.: US 9,605,626 B2
(45) Date of Patent: Mar. 28, 2017

(54) SILOXANE FILTRATION SYSTEM AND METHOD

(71) Applicant: Deere & Company, Moline, IL (US)

(72) Inventors: Thomas M. Harris, Waterloo, IA (US); Galen C. Thomas, Dubuque, IA (US); Teryl M. Oftedal, East Dubuque, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/640,582

(22) Filed: Mar. 6, 2015

(65) Prior Publication Data

US 2016/0258392 A1  Sep. 8, 2016

(51) Int. Cl.
| | | |
|---|---|---|
| *B01D 53/04* | (2006.01) |
| *F02M 35/02* | (2006.01) |
| *E02F 9/08* | (2006.01) |
| *B01D 46/00* | (2006.01) |
| *B01D 46/24* | (2006.01) |

(52) U.S. Cl.
CPC ..... *F02M 35/0218* (2013.01); *B01D 46/0024* (2013.01); *B01D 46/0036* (2013.01); *B01D 46/0046* (2013.01); *B01D 46/0086* (2013.01); *B01D 46/2411* (2013.01); *B01D 53/04* (2013.01); *E02F 9/0866* (2013.01); *F02M 35/0205* (2013.01); *B01D 2257/55* (2013.01); *B01D 2257/553* (2013.01); *B01D 2258/06* (2013.01)

(58) Field of Classification Search
CPC  B01D 53/04; B01D 53/0431; B01D 46/0036; B01D 46/446; B01D 2257/55; B01D 2257/553; B01D 2257/556; B01D 2279/60; F02M 35/0205; F02M 35/0214; F02M 35/0216; F02M 35/0218; E02F 9/0866
USPC ......................................................... 96/134
See application file for complete search history.

(56) References Cited

U.S. PATENT DOCUMENTS

| | | | | |
|---|---|---|---|---|
| 4,259,096 A | * | 3/1981 | Nakamura | ......... B01D 39/1607 156/306.6 |
| 5,604,306 A | * | 2/1997 | Schricker | ........... B01D 46/0086 116/DIG. 25 |

(Continued)

FOREIGN PATENT DOCUMENTS

| | | | |
|---|---|---|---|
| DE | 102004028016 A1 | 12/2005 | |
| DE | 10 2012 005381 | * 9/2013 | ......... B01D 46/0086 |
| DE | 102012005381 A1 | 9/2013 | |
| WO | 2008024329 A1 | 2/2008 | |
| WO | 2013169392 A1 | 11/2013 | |

OTHER PUBLICATIONS

"Treatment Solutions for Landfill Gas Fuel Applications", Xebec Adsorption Inc., White Paper, Oct. 2007, 14 pages.*

(Continued)

*Primary Examiner* — Jason M Greene

(57) ABSTRACT

A particulate and siloxane filtration system may include a housing and a filter media assembly. The filter media assembly may be disposed within the housing and positioned to filter intake gases to an internal combustion engine. The filter media assembly may include a particulate media configured to remove particulates from the intake gases and a siloxane media configured to remove siloxanes from the intake gases.

9 Claims, 5 Drawing Sheets

(56) References Cited

U.S. PATENT DOCUMENTS

| | | | | |
|---|---|---|---|---|
| 6,152,996 | A * | 11/2000 | Linnersten | B01D 46/0024 55/385.3 |
| 6,464,761 | B1 * | 10/2002 | Bugli | B01D 53/02 123/198 E |
| 7,264,648 | B1 | 9/2007 | Wetzel et al. | |
| 7,306,652 | B2 | 12/2007 | Higgins | |
| 7,393,381 | B2 | 7/2008 | Tower et al. | |
| 7,833,301 | B2 * | 11/2010 | Schindler | B01D 46/4281 123/198 E |
| 8,925,497 | B2 | 1/2015 | Besmann | |
| 2002/0129711 | A1 | 9/2002 | Oda et al. | |
| 2004/0050252 | A1 * | 3/2004 | Wernholm | B01D 53/0415 95/143 |
| 2006/0107836 | A1 * | 5/2006 | Maier | B01D 46/0024 96/134 |
| 2006/0272508 | A1 * | 12/2006 | Hoke | B01D 53/0415 96/134 |
| 2007/0068386 | A1 | 3/2007 | Mitariten | |
| 2008/0053050 | A1 * | 3/2008 | Arruda | B01D 46/0036 55/524 |
| 2008/0060524 | A1 * | 3/2008 | Tumbrink | B01D 46/0001 96/154 |
| 2008/0229720 | A1 * | 9/2008 | Benscoter | B01D 46/0086 55/290 |
| 2009/0107340 | A1 * | 4/2009 | Niakan | B01D 46/0036 96/135 |
| 2011/0094297 | A1 * | 4/2011 | Guzman | F02M 35/024 73/114.31 |
| 2013/0232934 | A1 | 9/2013 | Baseotto | |
| 2015/0023844 | A1 * | 1/2015 | Clayton, Jr. | F01N 3/035 422/169 |

OTHER PUBLICATIONS

English Language Machine Translation for DE 10 2012 005381. Retrieved from translationportal.epo.org on Oct. 29, 2016.*

Dewil, R.; Appels, L.; and Baeyens, J. "Energy Use of Biogas Hampered by the Presence of Siloxanes." Science Direct [online database]. Energy Conversion and Management, Nov. 21, 2005 [retrieved on Feb. 17, 2015]. Retrieved from the Internet<http://www.sciencedirect.com/science/article/pii/S0196890405002712>. DOI: <10.1016/j.enconman.2005.10.016>.

Wheless, E. and Pierce, J. "Siloxanes in Landfill and Digester Gas Update." In Proceedings of the 27th Solid Waste Association of North America Landfill Gas Symposium [online], Mar. 2004 [retrieved on Feb. 17, 2015]. Retrieved from the Internet<http://www.scsengineers.com/Papers/Pierce_2004Siloxanes_Update_Paper.pdf>.

Pierce, J. "Siloxane Quantification, Removal and Impact on Landfill Gas Utilization Facilities." The 8th Annual Landfill Methane Outreach Program Conference and Project Expo [online], Jan. 2005 [retrieved on Feb. 17, 2015]. Retrieved from the Internet: <http://www.epa.gov/lmop/documents/pdfs/conf/8th/presentation-Pierce.pdf>.

"Treatment Solutions for Landfill Gas Fuel Applications." Xebec Adsorption Inc., White Paper, Oct. 2007 [online brochure] [retrieved on Feb. 17, 2015]. Retrieved from the Internet: <http://www.xebecinc.com/pdf/e_white_paper.pdf>.

European Search report in foreign counterpart application No. 16155915.8 dated Jul. 8, 2016 (7 pages).

* cited by examiner

SILOXANE FILTRATION SYSTEM AND METHOD

FIELD OF THE DISCLOSURE

The present disclosure relates to a filtration system. An embodiment of the present disclosure relates to a siloxane filtration system for engine intake gases.

BACKGROUND

Work vehicles may be operated in environments, such as landfills, waste transfer stations, and recycling centers, where the air surrounding the work vehicle may contain siloxanes in a higher concentration than other work environments. Intake gases for an engine on such work vehicles may also contain an increased concentration of siloxanes, which are then exposed to the temperatures, pressures, fuels, and byproducts of combustion in the engine. This exposure may convert these siloxanes to other substances, including to silica or silicates, which may bind to, collect on, or plug portions of the engine and its exhaust aftertreatment system.

SUMMARY

According to an aspect of the present disclosure, a particulate and siloxane filtration system may include a housing and a filter media assembly. The filter media assembly may be disposed within the housing and positioned to filter intake gases to an internal combustion engine. The filter media assembly may include a particulate media configured to remove particulates from the intake gases and a siloxane media configured to remove siloxanes from the intake gases.

According to another aspect of the present disclosure, the siloxane media may be positioned in series with the particulate media relative to a flow of the intake gases. Each of the particulate media and the siloxane media may at least partially surround a common cavity. One of the particulate media and the siloxane media may be nested within the other of the particulate media and the siloxane media.

According to another aspect of the present disclosure, the particulate media and the siloxane media may each have a cylindrical shell shape, and the common cavity may be cylindrical.

According to another aspect of the present disclosure, the filter media assembly may be configured so as to be installable within, and removable from, the housing as a single piece.

According to another aspect of the present disclosure, the expected operational life of the particulate media may be between 50% and 150% of an expected operational life of the siloxane media.

According to another aspect of the present disclosure, the particulate and siloxane filtration system may include a pressure sensor and a controller. The pressure sensor may be configured to provide a pressure signal indicative of a pressure of the intake gases. The controller may be configured to receive the pressure signal and determine a remaining operational life of the filter media assembly based on the pressure signal.

According to another aspect of the present disclosure, a method of filtering particulates and siloxanes from intake gases to an internal combustion engine of a work vehicle may include providing a particulate media positioned to remove particulates from the intake gases, providing a siloxane media positioned to remove siloxanes from the intake gases, and sending an indication of a remaining operational life of at least one of the particulate media and the siloxane media, the indication based on a pressure of the intake gases and a threshold pressure associated with the particulate media.

According to another aspect of the present disclosure, the indication may be of the remaining operational life of the siloxane media.

According to another aspect of the present disclosure, the particulate media may have an expected operational life between 50% and 150% of the expected operational life of the siloxane media.

According to another aspect of the present disclosure, a work vehicle may include ground-engaging tractive assemblies, an internal combustion engine, and a filtration system. The internal combustion engine may be configured to power the ground-engaging tractive assemblies so as to move the work vehicle. The filtration system may be positioned to filter intake gases to the engine. The filtration system may include a housing, a particulate media, and a siloxane media. The particulate media may be disposed within the housing and configured to remove particulates from the intake gases. The siloxane media may be disposed within the housing and configured to remove siloxanes from the intake gases.

According to another aspect of the present disclosure, the work vehicle may include an exhaust aftertreatment system positioned to treat exhaust from the engine.

According to another aspect of the present disclosure, the siloxane media may be positioned in series with the particulate media relative to the flow of the intake gases. The particulate media and the siloxane media may each have a cylindrical shell shape. One of the particulate media and the siloxane media may be nested within the other of the particulate media and the siloxane media.

According to another aspect of the present disclosure, the particulate media may be positioned upstream of the siloxane media relative to the flow of the intake gases.

According to another aspect of the present disclosure, the particulate media may have an expected operational life between 50% and 150% of the expected operational life of the siloxane media.

According to another aspect of the present disclosure, the expected operational life of the particulate media and the siloxane media may be based on operation of the work vehicle in a landfill application.

According to another aspect of the present disclosure, the siloxane media may be positioned in series with the particulate media relative to the flow of the intake gases. The particulate media may have an expected operational life between 50% and 150% of the expected operational life of the siloxane media.

According to another aspect of the present disclosure, the work vehicle may include a pressure sensor and a controller. The pressure sensor may be configured to provide a pressure signal indicative of a pressure of the intake gases. The controller may be configured to receive the pressure signal and determine a remaining operational life of the siloxane media based on the pressure signal.

According to another aspect of the present disclosure, the particulate media may have an expected operational life between 75% and 125% of the expected operational life of the siloxane media.

According to another aspect of the present disclosure, the particulate media and the siloxane media may be included in a filter media assembly, and the filter media assembly is configured so as to be installable within, and removable from, the housing as a single piece.

According to another aspect of the present disclosure, the siloxane media may be positioned in series with the particulate media relative to the flow of the intake gases. The particulate media and the siloxane media may be included in a filter media assembly configured so as to be installable within, and removable from, the housing as a single piece.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
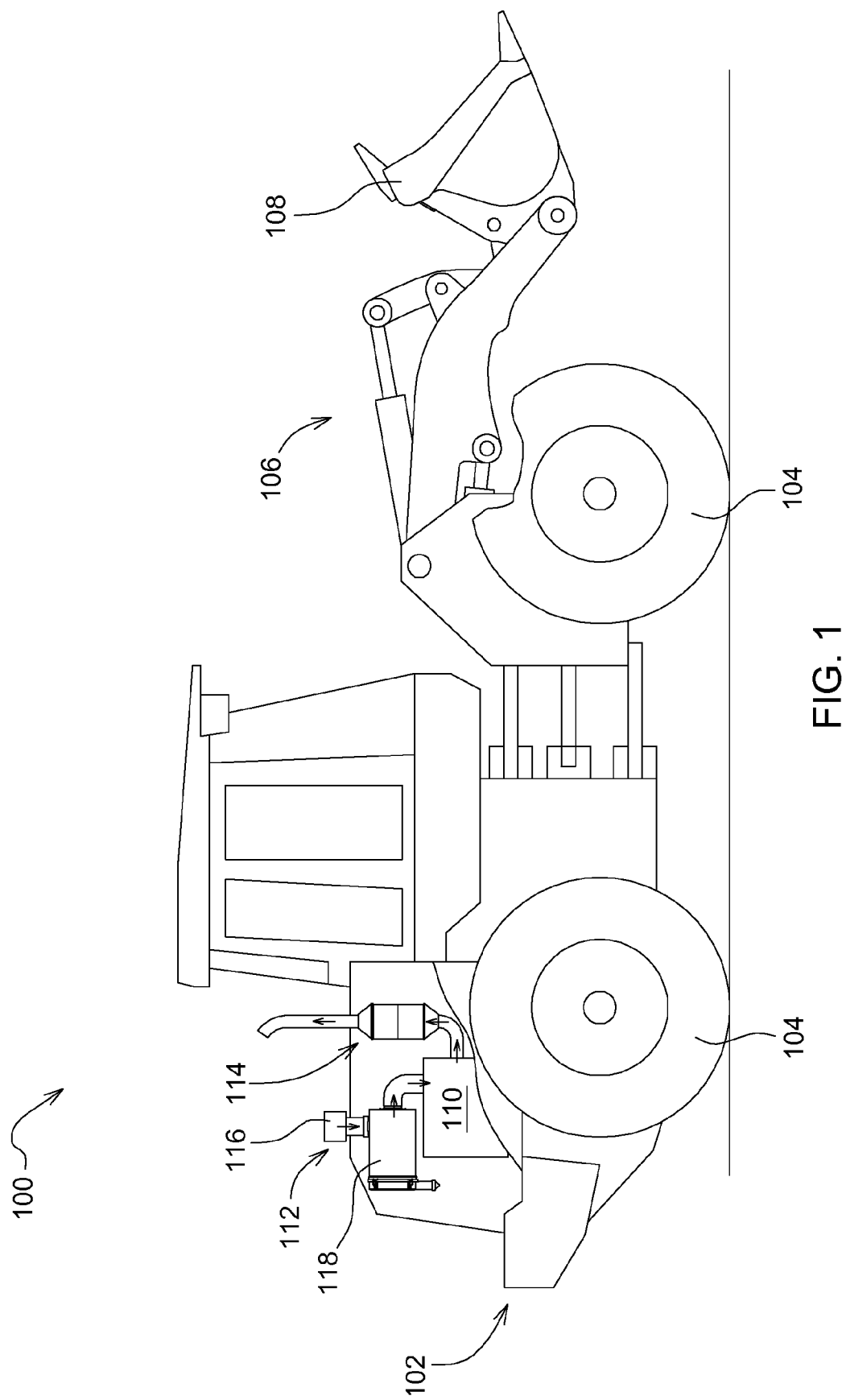
FIG. 1 is a right side view of a work vehicle with a particulate and siloxane filtration system, for example a wheel loader.

FIG. 1 illustrates work vehicle 100, including chassis 102, ground-engaging tractive assemblies 104 (in this embodiment, wheels), linkage 106, and work tool 108. Work vehicle 100 is powered by an engine 110, which in this embodiment is an internal combustion diesel engine. Engine 110 takes in gases, such as fresh atmospheric air, through air intake assembly 112, combusts the intake gases with diesel fuel, and exhausts the combustion products to aftertreatment assembly 114. Work vehicle 100 is illustrated as a wheel loader, but may be any work vehicle with an internal combustion engine, including an articulated dump truck, backhoe loader, compact track loader, crawler (e.g., crawler dozer, crawler loader), excavator, feller buncher, forwarder, harvester, knuckleboom loader, motor grader, scraper, skidder, sprayer, skid steer, tractor (e.g., agricultural tractor), and tractor loader.

Air intake assembly 112 filters the intake gases to engine 110 and includes pre-cleaner 116 and particulate and siloxane filtration system 118. Pre-cleaner 116 includes a screen to filter out debris in the intake gases and then utilizes the velocity of the remaining intake gases to spin out further particulate debris which may be included with the fresh atmospheric air being taken in at the beginning of air intake assembly 112. Pre-cleaner 116 may also be referred to as a cyclonic filter, cyclonic pre-cleaner, centrifugal filter, or centrifugal pre-cleaner, and is an optional component of the present disclosure as alternative embodiments may utilize an alternative pre-cleaner system (e.g., only a screen, pre-filters, electrostatic filtration) or may forgo a pre-cleaner system entirely. After the intake gases have passed through pre-cleaner 116, they are drawn into particulate and siloxane filtration system 118.

Particulate and siloxane filtration system 118 includes a housing and filtration media designed to filter particulates (e.g., dust, sand, debris) and siloxanes from the intake gases to engine 110. Siloxanes are a class of compounds which may be byproducts or waste products from industrial (e.g., semiconductor) and domestic (e.g., personal care products) sources. As byproducts or waste products, siloxanes may be found in landfills, waste transfer stations, recycling centers, and other similar environments, and may be sufficiently volatile to become airborne and form part of the local atmospheric gases. These gases may form part of the intake gases of an internal combustion engine, either by intent as the gases contain hydrocarbons and may be harvested and combusted to produce energy, or by necessity in the case of a work vehicle taking in air from the local environment. When exposed to the temperatures and pressures of combustion, siloxanes may produce silicon dioxide ($SiO_2$), other silicates, or other compounds which may adhere to, or accumulate within, nearby components, such as the internal components or aftertreatment systems of an internal combustion engine. The removal of particulates and siloxanes from the intake gases may improve the performance, longevity, or reliability of engine 110 or aftertreatment assembly 114 by avoiding such adhesion or accumulation.

After traveling through particulate and siloxane filtration system 118, the intake gases may be drawn into engine 110, where they may be mixed with a fuel, such as diesel fuel, and combusted. The post-combustion gases may then be expelled from engine 110 to aftertreatment assembly 114. Aftertreatment assembly 114 may be included with work vehicle 100 to filter out certain portions of the combustion gases of engine 110 to control emissions, for example soot, ash, and nitrogen oxides ($NO_x$). Techniques for doing so include passing the post-combustion gases through a diesel particulate filter (DPF filter), a diesel oxidation catalyst (DOC), and/or a selective catalytic reduction catalyst (SCR). The components involved in these systems may be adversely affected by the presence of silicates in the post-combustion gases, which may fill or otherwise block the components, or adhere to the internal surfaces of the components and adversely affect their performance. After traveling through aftertreatment assembly 114, the post-combustion gases may then be expelled through the exhaust of work vehicle 100.

Figure 2:
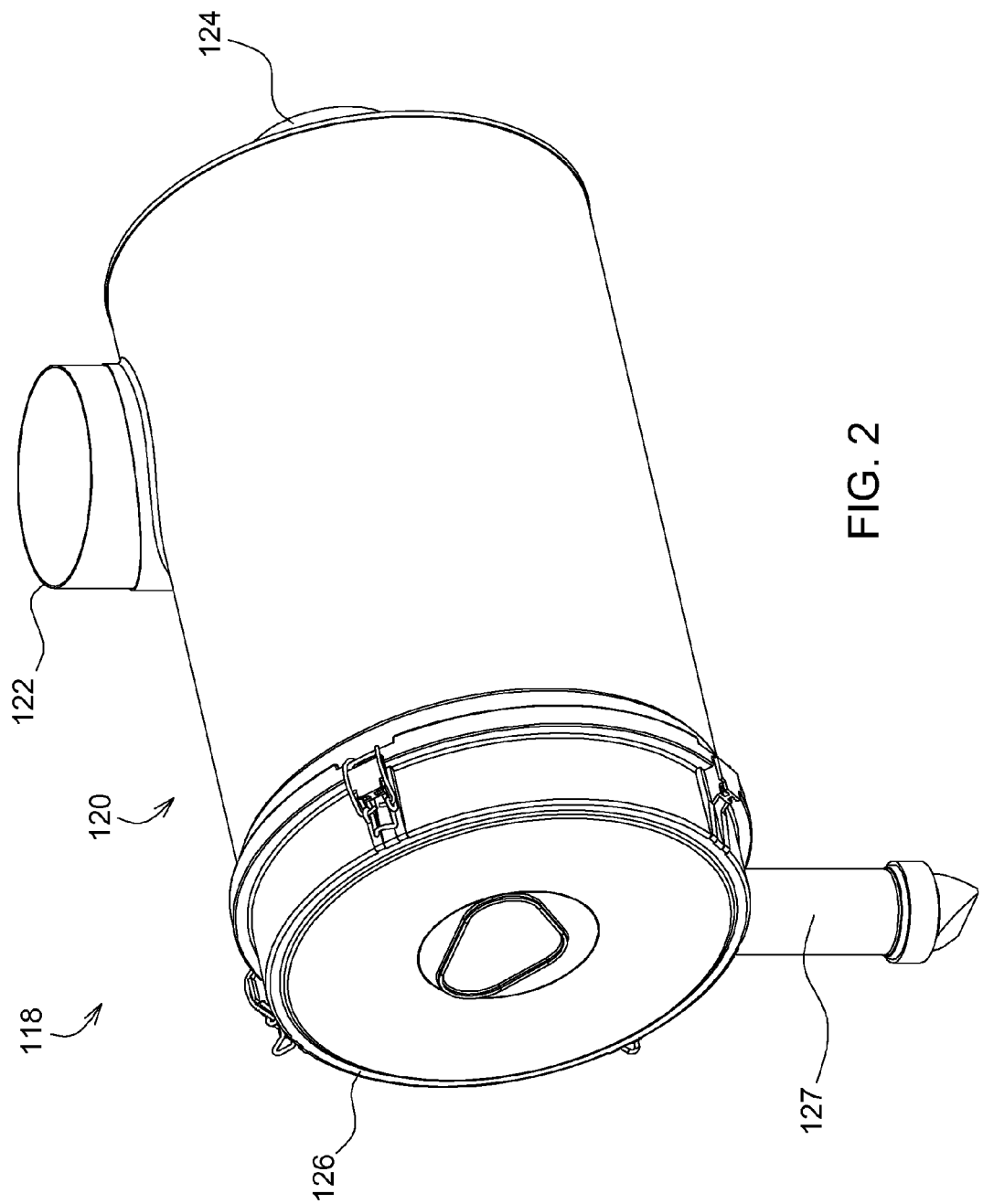
FIG. 2 is a perspective view of the particulate and siloxane filtration system.

FIG. 2 illustrates the particulate and siloxane filtration system 118. Particulate and siloxane filtration system 118 includes a housing 120 which surrounds and encloses the other components of particulate and siloxane filtration system 118 and forms an inlet 122 and outlet 124. Housing 120 also includes end cap 126, which is removable so as to allow access to the interior of housing 120 and provide for a way to service the filter media. End cap 126 may also be configured to collect dust from the intake gases which comes in through inlet 122 but does not pass through a filter media within particulate and siloxane filtration system 118, and allow such dust to be emptied from dust collector 127.

Figure 3:
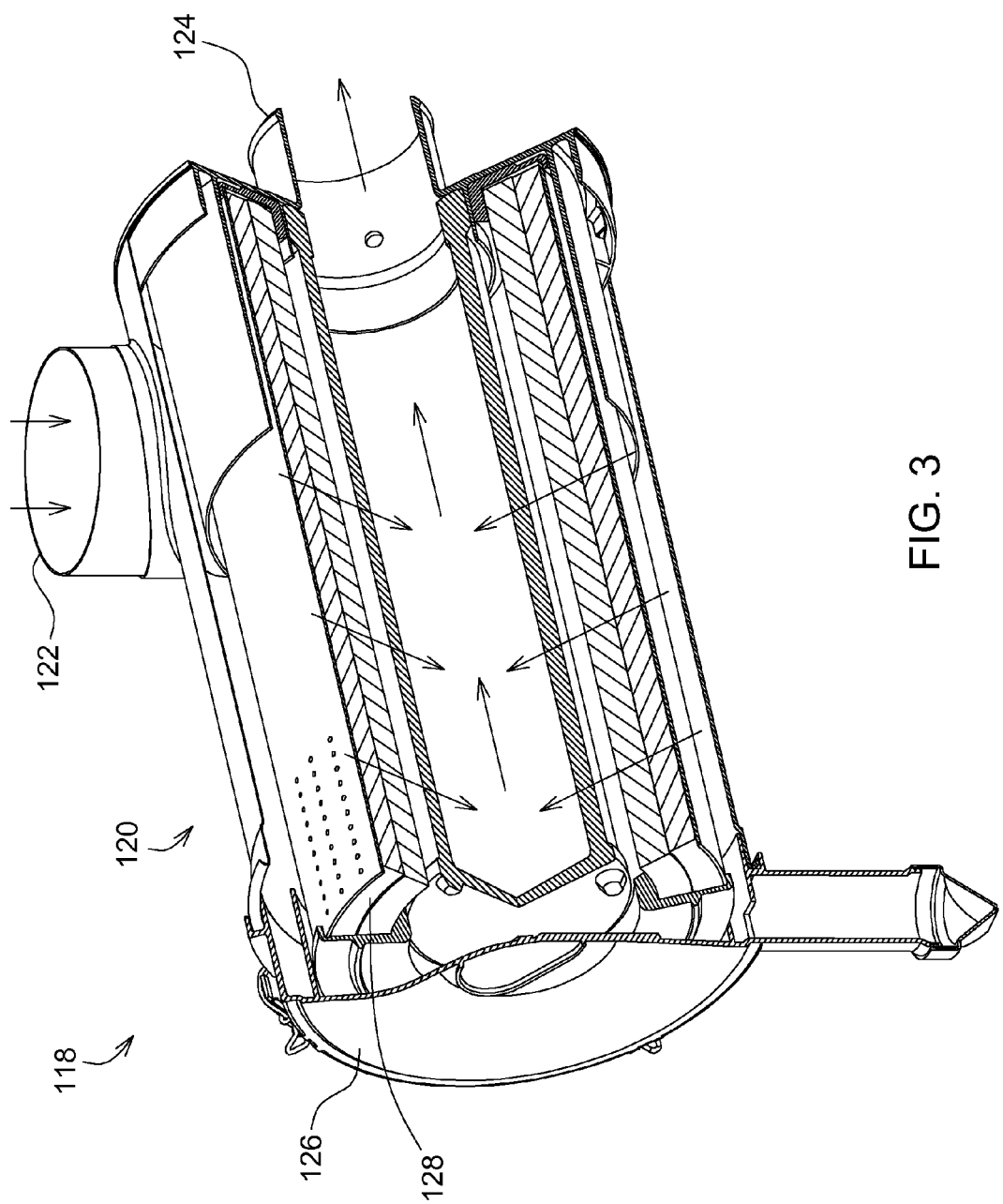
FIG. 3 is a perspective view of the particulate and siloxane filtration system with portions removed to view its interior.

FIG. 3 illustrates the particulate and siloxane filtration system 118 with portions removed so as to make interior components visible. Housing 120 surrounds and encloses filter media assembly 128, which is installed within housing 120 and positioned so that intake gases flow from inlet 122 through filter media assembly 128 to outlet 124. More specifically, intake gases flow in through inlet 122 and surround filter media assembly 128. The intake gases surrounding filter media assembly 128 are drawn through filter media assembly 128 by the pressure differential across filter media assembly 128 created by engine 110's draw of the intake gases, such that the intake gases flow transverse to filter media assembly 128 into the cavity surrounded by filter media assembly 128. The intake gases in this cavity then flow out through outlet 124.

Housing 120 and filter media assembly 128 each have a cylindrical shape such that each surrounds a common cylindrical cavity positioned about the axis center of housing 120.

Figure 4:
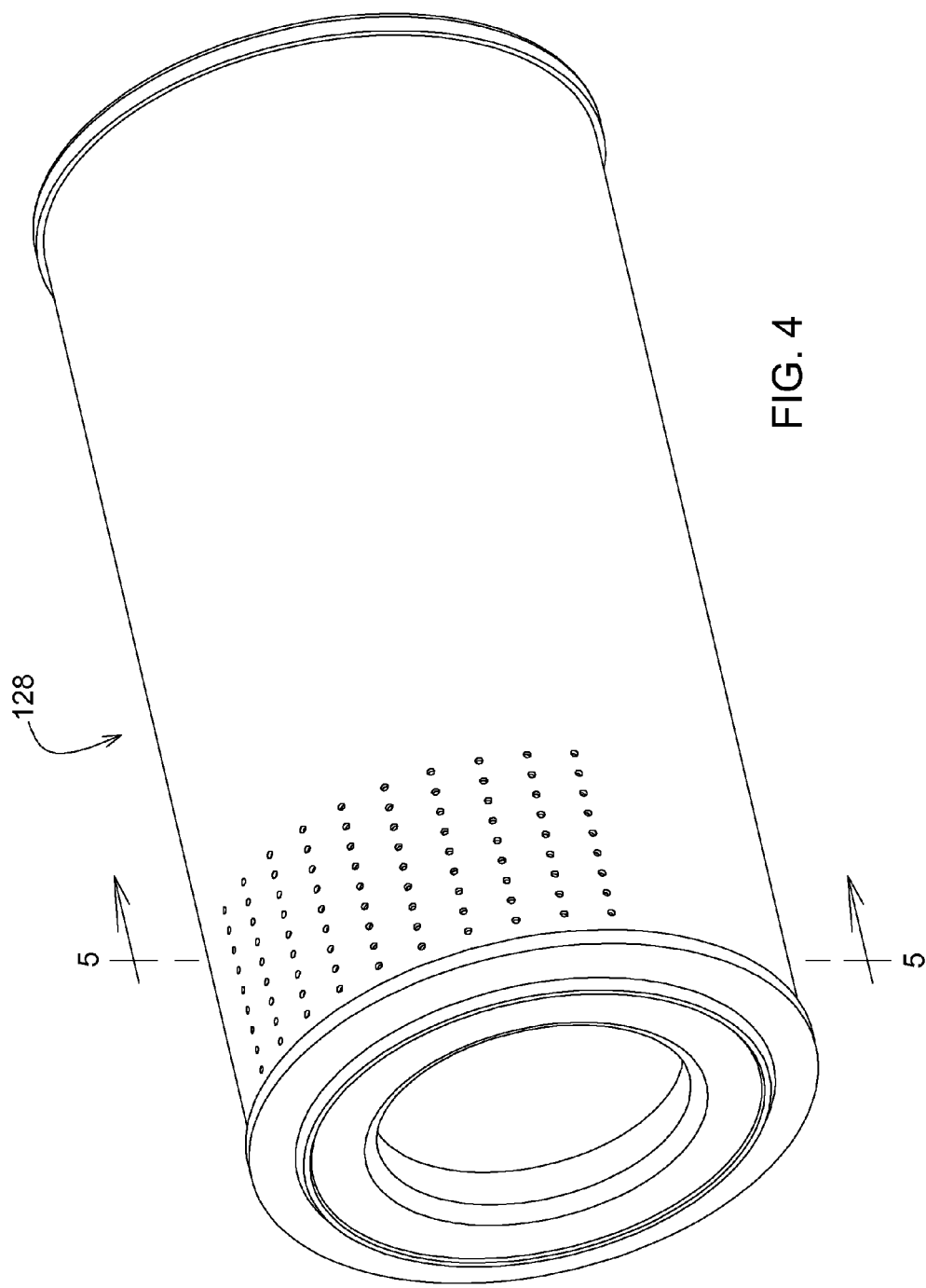
FIG. 4 is a perspective view of a filter media assembly.

As used herein, "cylindrical" is not limited to a geometrically ideal right cylinder, but includes a cylindrical shell, elliptic cylinder, punctured disk, projected annulus, and other substantially cylindrical shapes. In alternative embodiments, housing 120 and filter media assembly 128 may each have different shapes, such as a rectangular prism or box-like shape. In the embodiment illustrated in FIG. 3, the cylindrical shapes allow housing 120 to be opened via end cap 126, which is latched at one end of housing 120, and allow filter media assembly 128 to slide out of housing 120 in the direction of end cap 126. Filter media assembly 128 may then be replaced by a new or regenerated version, which can slide into that same end of housing 120, and end cap 126 can be closed and latched. FIG. 4 illustrates filter media assembly 128 when taken out of housing 120. Filter media assembly 128 may also be known as a filter element, or the serviceable filter for work vehicle 100.

Figure 5:
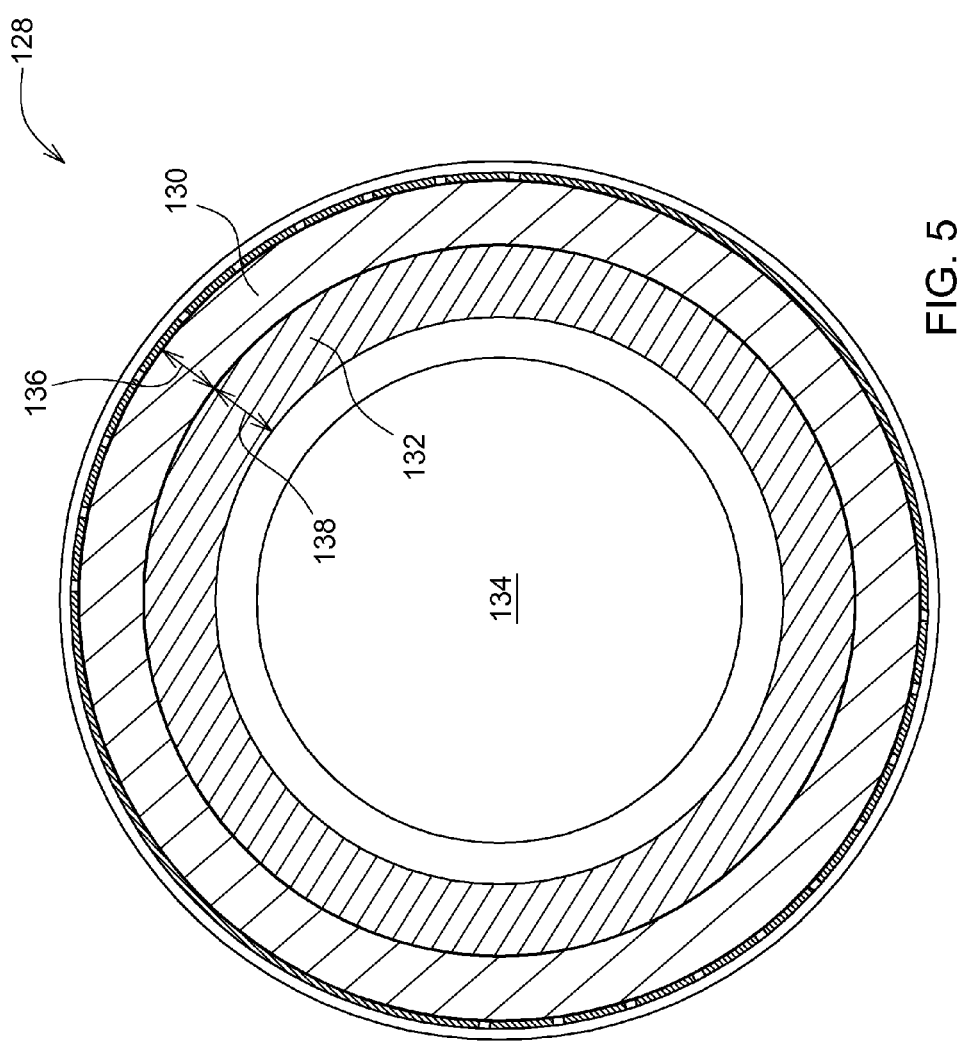
FIG. 5 is a sectional view of the filter media assembly, taken along line 5-5 of FIG. 4.

FIG. 5 illustrates a cross-section of filter media assembly 128 taken along section plane 5-5 of FIG. 4. Filter media assembly 128 includes particulate media 130 and siloxane media 132. Particulate media 130 and siloxane media 132 are each a cylindrical shape (i.e., a cylindrical shell shape) and each is positioned so as to surround cavity 134 running down the axial center of filter media assembly 128. Particulate media 130 is located outward of siloxane media 132 such that it surrounds siloxane media 132, which is nested within particulate media 130. In alternative embodiments, particulate media 130 and siloxane media 132 may be interchanged such that siloxane media 132 is located outward of particulate media 130, and particulate media 130 is nested within siloxane media 132. This configuration of filter media assembly 128 allows both particulates and siloxanes to be filtered out by a single filter media assembly contained within a single housing, which may be beneficial for certain applications in terms of serviceability and packaging.

The configuration of filter media assembly 128 shown in FIG. 5 results in intake gases flowing into housing 120, then flowing transverse to particulate media 130, then flowing transverse to siloxane media 132 until they reach cavity 134 and can flow out of housing 120 to engine 110. As the intake gases flow transverse to particulate media 130, particulates which may be included in the intake gases are filtered out by particulate media 130. As the intake gases flow transverse to siloxane media 132, siloxanes are filtered out by siloxane media 132.

Siloxanes may be filtered from the intake gases by multiple techniques, including the process of adsorption. For example, siloxane media 132 may contain activated alumina or activated carbon, or other compounds which may adsorb gaseous siloxane. This adsorption process may be reversible as well, for example by passing a regeneration gas through the same media, which releases the siloxanes from the adsorption compound and allows siloxane media 132 to be reused for siloxane filtration. An embodiment utilizing a media with a reversible siloxane adsorption process may thus enable the reuse of siloxane media 132, for example by removing filter media assembly 128, regenerating siloxane media 132, and reinstalling filter media assembly 128 in work vehicle 100.

Particulate media 130 has a thickness 136 in the radial direction, or the direction of the flow of intake gases, which may result in certain performance characteristics related to filtration efficiency (e.g., dust count, size, or weight below a threshold) and operational life (e.g., an expected operational life of 500 hours). Similarly, siloxane media 132 has a thickness 138 in the radial direction, or the direction of the flow of intake gases, which may result in certain performance characteristics related to filtration efficiency (e.g., parts per million of siloxane below a threshold) and operational life (e.g., an expected operational life of 500 hours). Thickness 136 and thickness 138 may be selected for each of particulate media 130 and siloxane media 132 so as to enable the overall filter media assembly 128 to achieve the filtration efficiency and operational life targets for both particulates and siloxanes. The ratio of thickness 136 to thickness 138 may also be selected to achieve a similar expected operational life for both particulate media 130 and siloxane media 132, such that the expected operational life for one of the media is within 50-150% of the expected operational life of the other media. For certain applications, a smaller range may be utilized, such that the expected operational life for one of the media is within 75-125% of the expected operational life of the other media. Selecting such a ratio may enable filter media assembly 128 to be serviced as a single part while reducing the unused filtering capacity in either particulate media 130 or siloxane media 132. Additionally, selecting such a ratio may also enable monitoring of the condition of filter media assembly 128, as described further below.

As particulate media 130 is used in operation, it will tend to fill with dust and debris resulting in an increased pressure drop for intake gases flowing through it. This pressure drop can be measured, such as through a pressure sensor measuring the pressure in cavity 134, the pressure of the intake gases at a location upstream or downstream of cavity 134, or the pressure drop across filter media assembly 128. The pressure sensor may then send a pressure signal indicative of this pressure to a controller on work vehicle 100. The controller, which is configured to receive this pressure signal, may send an alert regarding the remaining operational life of filter media assembly 128 based on this pressure signal, such as sending an alert once the pressure signal passes a threshold value. The alert may be a notification communicated to an operator of work vehicle 100 (e.g., a warning message on a display, the lighting of an indicator or icon) or a fleet manager for work vehicle 100 (e.g., a message communicated wirelessly to a server, which in turn communicates with a client used by the fleet manager) that there is no operational life remaining and the filter media assembly 128 should be replaced. Upon receiving such a communication, the operator, fleet manager, or another individual may remove filter media assembly 128 and replace it with a new or reconditioned part with remaining operational life. The controller may also send an alert indicating that filter media assembly 128 has a limited number of operational hours remaining and replacement should be planned. The controller may also communicate, continuously or at set intervals, the remaining life left for filter media assembly 128, for example by determining how close the current pressure signal is to the threshold pressure at which a filter change is recommended, and communicating that to an operator of work vehicle 100 or a fleet manager for work vehicle 100 (e.g., 40% of filter life remaining, 200 hours of filter life remaining).

By contrast, certain siloxane adsorption media does not have a similar property where the pressure drop across the media rises as the media is used in operation so a pressure measurement cannot be used to determine when the media needs to be replaced. For such media, thickness 136 and thickness 138 may each be selected such that the expected operational life of particulate media 130 is the same as the expected operational life of siloxane media 132. One method for selecting these thicknesses would be to sample a specific work environment for particles and siloxanes to quantify the relative concentrations of particles and siloxanes. This sampling information could be used to choose from among designs for filter media assembly 128 with different ratios of thickness 136 and thickness 138, so that the fractional volumes of the two filtration media may be appropriately selected for the specific work environment.

If thickness 136 and thickness 138 are each selected to achieve a similar expected operational life between particulate media 130 and siloxane media 132, the pressure drop across filter media assembly 128 may then be monitored to determine the overall remaining operational life for filter media assembly 128, under the assumption that particulate media 130 and siloxane media 132 should wear out (i.e., or reach saturation, or become exhausted) at the same rate so that the condition of particulate media 130 is representative of the condition of siloxane media 132. By setting the ratio of thickness 136 to thickness 138 so that the expected life is the same for particulate media 130 and siloxane media 132, and then measuring the pressure drop across filter media assembly 128, a filter change notification to the operator can depend on the actual condition of filter media assembly 128 rather than an estimated operational life. This may be beneficial if work vehicle 100 may be exposed to duty cycles heavier or lighter than the average used when the expected operational life of the filter media was determined.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method of filtering particulates and siloxanes from intake gases to an internal combustion engine of a work vehicle, comprising:
    providing a particulate media positioned to remove particulates from the intake gases;
    providing a siloxane media positioned to remove siloxanes from the intake gases; and
    sending an indication indicative of a remaining operational life of the siloxane media, the indication based on a pressure of the intake gases and a relationship between the pressure and the remaining operational life of the particulate media.

2. The method of claim 1, wherein the particulate media has an expected operational life between 50% and 150% of the expected operational life of the siloxane media.

3. A work vehicle comprising:
    ground-engaging tractive assemblies;
    an internal combustion engine configured to power the ground-engaging tractive assemblies so as to move the work vehicle;
    a filtration system positioned to filter intake gases to the engine, the filtration system comprising:
        a housing;
        a particulate media disposed within the housing, the particulate media configured to remove particulates from the intake gases; and
        a siloxane media disposed within the housing, the siloxane media configured to remove siloxanes from the intake gases;
    a pressure sensor configured to provide a pressure signal indicative of a pressure of the intake gases; and
    a controller configured to receive the pressure signal and determine a remaining operational life of the siloxane media based on the pressure signal and a relationship between the pressure signal and the remaining operational life of the particulate media;
    wherein:
        the siloxane media is positioned in series with the particulate media relative to the flow of the intake gases;
        the particulate media and the siloxane media each have a cylindrical shell shape;
        one of the particulate media and the siloxane media is nested within the other of the particulate media and the siloxane media; and
        an expected operational life of the particulate media is between 50% and 150% of an expected operational life of the siloxane media.

4. The work vehicle of claim 3, further comprising an exhaust aftertreatment system positioned to treat exhaust from the engine.

5. The work vehicle of claim 3, wherein the particulate media is positioned upstream of the siloxane media relative to the flow of the intake gases.

6. The work vehicle of claim 5, wherein the particulate media has an expected operational life between 75% and 125% of the expected operational life of the siloxane media.

7. The work vehicle of claim 6, wherein the expected operational life of the particulate media and the siloxane media is based on operation of the work vehicle in a landfill application.

8. The work vehicle of claim 3, wherein the particulate media and the siloxane media are included in a filter media assembly, and the filter media assembly is configured so as to be installable within, and removable from, the housing as a single piece.

9. The work vehicle of claim 3, wherein the siloxane media is positioned in series with the particulate media relative to the flow of the intake gases, the particulate media and the siloxane media are included in a filter media assembly, and the filter media assembly is configured so as to be installable within, and removable from, the housing as a single piece.

* * * * *